(12) United States Patent
Go et al.

(10) Patent No.: US 8,482,456 B2
(45) Date of Patent: Jul. 9, 2013

(54) SENSOR ASSEMBLY AND METHOD OF MEASURING THE PROXIMITY OF A MACHINE COMPONENT TO AN EMITTER

(75) Inventors: Steven Go, Schenectady, NY (US); Boris Leonid Sheikman, Minden, NV (US); William Platt, Hagaman, NY (US)

(73) Assignee: General Electric Company, Niskayuna, NY (US)

( * ) Notice: Subject to any disclaimer, the term of this patent is extended or adjusted under 35 U.S.C. 154(b) by 198 days.

(21) Appl. No.: 12/970,525

(22) Filed: Dec. 16, 2010

(65) Prior Publication Data

US 2012/0154202 A1   Jun. 21, 2012

(51) Int. Cl.
  *G01S 13/08* (2006.01)
(52) U.S. Cl.
  USPC ............... 342/125; 342/118; 342/145
(58) Field of Classification Search
  USPC .................................. 342/104–146
  See application file for complete search history.

(56) References Cited

U.S. PATENT DOCUMENTS

| | | |
|---|---|---|
| 4,045,727 A | 8/1977 | Yu et al. |
| 4,313,118 A | 1/1982 | Calvin |
| 4,346,383 A | 8/1982 | Woolcock et al. |
| 4,384,819 A | 5/1983 | Baker |
| 4,652,864 A | 3/1987 | Calvin |
| 4,845,422 A | 7/1989 | Damon |
| 4,862,061 A | 8/1989 | Damon |
| 5,097,227 A | 3/1992 | Yuan et al. |
| 5,227,667 A | 7/1993 | Takinami et al. |
| 5,334,969 A | 8/1994 | Abe et al. |
| 5,459,397 A | 10/1995 | Spillman, Jr. |
| 5,459,405 A | 10/1995 | Wolff et al. |
| 5,506,515 A | 4/1996 | Godshalk et al. |
| 5,670,886 A | 9/1997 | Wolff et al. |
| 5,748,002 A | 5/1998 | Scott et al. |
| 5,801,530 A | 9/1998 | Crosby et al. |
| 5,818,242 A | 10/1998 | Grzybowski et al. |
| 5,854,553 A | 12/1998 | Barclay et al. |
| 5,854,994 A | 12/1998 | Canada et al. |
| 5,963,034 A | 10/1999 | Mahapatra et al. |
| 5,992,237 A | 11/1999 | McCarty et al. |
| 6,043,774 A | 3/2000 | Singh et al. |
| 6,118,287 A | 9/2000 | Boll et al. |
| 6,227,703 B1 | 5/2001 | DiMatteo et al. |
| 6,261,247 B1 | 7/2001 | Ishikawa et al. |
| 6,320,550 B1 | 11/2001 | Van Voorhies |
| 6,407,540 B1 | 6/2002 | Shepherd |
| 6,407,562 B1 | 6/2002 | Whiteman |
| 6,437,751 B1 | 8/2002 | Craven et al. |
| 6,445,995 B1 | 9/2002 | Mollmann |

(Continued)

OTHER PUBLICATIONS

Search Report and Written Opinion from corresponding EP Application No. 11191655.7-2213 dated Mar. 8, 2012.

*Primary Examiner* — Timothy A Brainard
(74) *Attorney, Agent, or Firm* — Jason K. Klindtworth

(57) ABSTRACT

A microwave sensor assembly includes at least one probe including an emitter configured to generate an electromagnetic field from at least one microwave signal. The emitter is also configured to generate at least one loading signal representative of a loading induced within the emitter by an object positioned within the electromagnetic field. The microwave sensor assembly also includes a signal processing device coupled to the at least one probe. The signal processing device includes a linearizer configured to generate a substantially linear output signal based on the at least one loading signal.

20 Claims, 4 Drawing Sheets

U.S. PATENT DOCUMENTS

| | | | |
|---|---|---|---|
| 6,462,561 B1 * | 10/2002 | Bigelow et al. | 324/637 |
| 6,620,057 B1 | 9/2003 | Pirritano et al. | |
| 6,750,621 B2 | 6/2004 | Gandrud | |
| 6,778,132 B2 | 8/2004 | Palata | |
| 6,864,796 B2 | 3/2005 | Lehrman et al. | |
| 6,878,147 B2 | 4/2005 | Prakash et al. | |
| 6,984,994 B2 | 1/2006 | Gregg | |
| 7,073,384 B1 | 7/2006 | Donskoy et al. | |
| 7,079,029 B2 | 7/2006 | Tsuji | |
| 7,079,030 B2 | 7/2006 | Tsuji | |
| 7,119,737 B2 | 10/2006 | Tsuji | |
| 7,159,774 B2 | 1/2007 | Woodard et al. | |
| 7,176,829 B2 | 2/2007 | Tsuji | |
| 7,206,719 B2 | 4/2007 | Lindsay et al. | |
| 7,215,111 B2 | 5/2007 | Kaneyasu et al. | |
| 7,215,252 B2 | 5/2007 | Schenck | |
| 7,250,920 B1 | 7/2007 | Steinbrecher | |
| 7,256,376 B2 | 8/2007 | Tsuji | |
| 7,274,189 B2 | 9/2007 | Chen et al. | |
| 7,280,078 B2 | 10/2007 | Salsman et al. | |
| 7,318,824 B2 | 1/2008 | Prakash et al. | |
| 7,423,934 B1 | 9/2008 | Uzes | |
| 7,455,495 B2 | 11/2008 | Leogrande et al. | |
| 7,483,800 B2 | 1/2009 | Geisheimer et al. | |
| 7,492,165 B2 | 2/2009 | Maier et al. | |
| 7,527,623 B2 | 5/2009 | Prakash et al. | |
| 7,532,151 B2 | 5/2009 | Touge et al. | |
| 7,541,995 B1 | 6/2009 | Murphy, Jr. | |
| 7,554,324 B2 | 6/2009 | Gualtieri | |
| 7,604,413 B2 | 10/2009 | Koike et al. | |
| 7,777,610 B2 | 8/2010 | O'Toole et al. | |
| 2004/0196177 A1 | 10/2004 | Billington et al. | |
| 2005/0219089 A1 | 10/2005 | Batruni | |
| 2008/0303513 A1 | 12/2008 | Turner | |
| 2009/0102451 A1 | 4/2009 | Kwark | |
| 2009/0243915 A1 | 10/2009 | Nishizato et al. | |
| 2010/0125269 A1 | 5/2010 | Emmons et al. | |
| 2010/0211334 A1 | 8/2010 | Sheikman et al. | |
| 2012/0126794 A1 * | 5/2012 | Jensen et al. | 324/149 |
| 2012/0126825 A1 * | 5/2012 | Sheikman et al. | 324/629 |
| 2012/0126826 A1 * | 5/2012 | Sheikman et al. | 324/629 |
| 2012/0126827 A1 * | 5/2012 | Lee et al. | 324/629 |
| 2012/0126828 A1 * | 5/2012 | Cohen et al. | 324/629 |
| 2012/0126829 A1 * | 5/2012 | Sheikman et al. | 324/635 |
| 2012/0126830 A1 * | 5/2012 | Jensen et al. | 324/635 |
| 2012/0126832 A1 * | 5/2012 | Jensen et al. | 324/644 |
| 2012/0128631 A1 * | 5/2012 | Sussman | 424/93.2 |

* cited by examiner

SENSOR ASSEMBLY AND METHOD OF MEASURING THE PROXIMITY OF A MACHINE COMPONENT TO AN EMITTER

BACKGROUND OF THE INVENTION

The present application relates generally to power systems and, more particularly, to a sensor assembly and a method of measuring the proximity of a machine component relative to an emitter.

Known machines may exhibit vibrations and/or other abnormal behavior during operation. One or more sensors may be used to measure and/or monitor such behavior and to determine, for example, an amount of vibration exhibited in a machine drive shaft, a rotational speed of the machine drive shaft, and/or any other operational characteristic of an operating machine or motor. Often, such sensors are coupled to a machine monitoring system that includes a plurality of monitors. The monitoring system receives signals from one or more sensors, performs at least one processing step on the signals, and transmits the modified signals to a diagnostic platform that displays the measurements to a user.

At least some known machines use eddy current sensors to measure the vibrations in, and/or a position of, a machine component. However, the use of known eddy current sensors may be limited because a detection range of such sensors is only about half of a width of the eddy current sensing element. Other known machines use optical sensors to measure a vibration and/or a position of a machine component. However, known optical sensors may become fouled by contaminants and provide inaccurate measurements, and as such, may be unsuitable for industrial environments. Moreover, known optical sensors may not be suitable for detecting a vibration and/or a position of a machine component through a liquid medium and/or a medium that includes particulates.

BRIEF DESCRIPTION OF THE INVENTION

In one embodiment, a microwave sensor assembly is provided that includes at least one probe including an emitter configured to generate an electromagnetic field from at least one microwave signal. The emitter is also configured to generate at least one loading signal representative of a loading induced within the emitter by an object positioned within the electromagnetic field. The microwave sensor assembly also includes a signal processing device coupled to the at least one probe. The signal processing device includes a linearizer configured to generate a substantially linear output signal based on the at least one loading signal.

In another embodiment, a power system is provided that includes a machine and a microwave sensor assembly positioned proximate the machine. The microwave sensor assembly includes at least one probe including an emitter configured to generate an electromagnetic field from at least one microwave signal, wherein a loading is induced within the emitter when at least one component of the machine is positioned within the electromagnetic field. The emitter is also configured to generate at least one loading signal representative of the induced loading. The microwave sensor assembly also includes a signal processing device coupled to the at least one probe. The signal processing device includes a linearizer configured to generate a substantially linear output signal based on the at least one loading signal.

In yet another embodiment, a method for measuring a proximity of a machine component relative to an emitter is provided. The method includes generating an electromagnetic field based on at least one microwave signal transmitted to the emitter, and generating at least one loading signal representative of a loading induced within the emitter by an interaction of the machine component with the electromagnetic field. A substantially linear proximity measurement of the machine component to the emitter is generated based on the at least one loading signal, and the proximity measurement is output to a user.

DETAILED DESCRIPTION OF THE INVENTION

Figure 1:
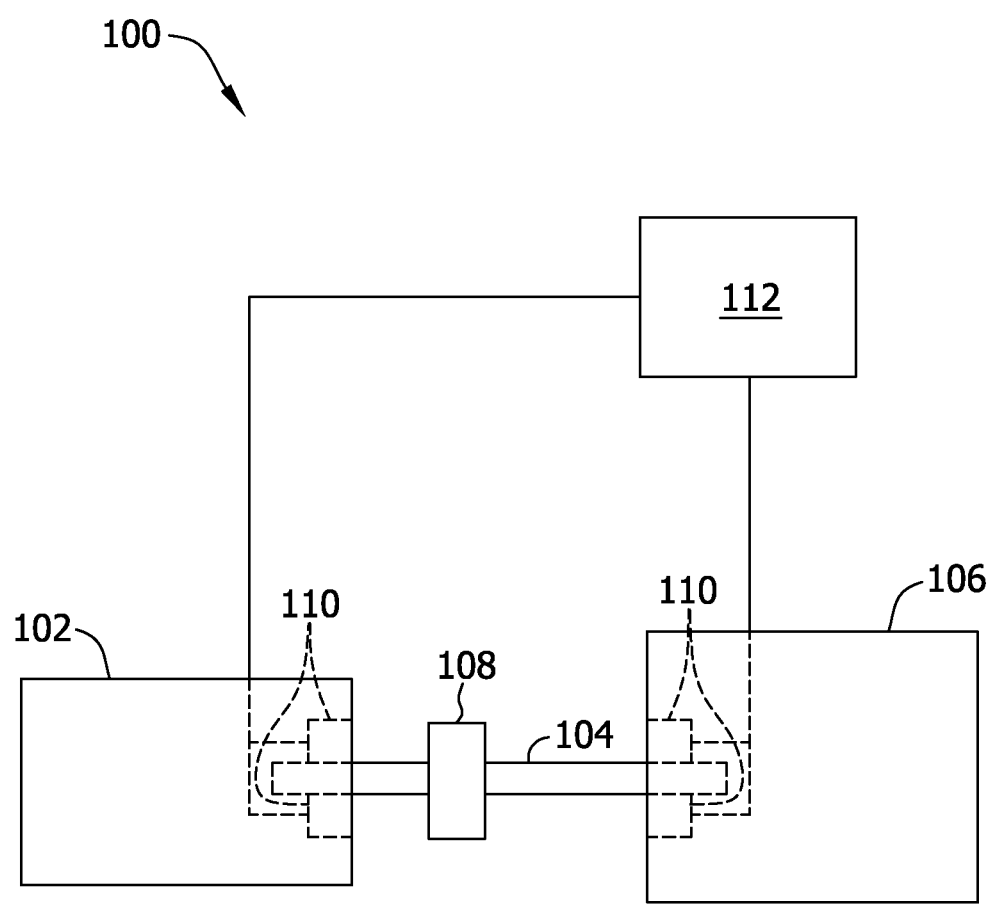
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, a steam turbine, an electric engine, or a compressor. Alternatively, machine 102 may be any other machine used in a power system. In the exemplary embodiment, machine 102 rotates a drive shaft 104 coupled to a load 106, such as a generator.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100 that enables system 100 to function as described herein. More specifically, in the exemplary embodiment, sensor assembly 110 is a proximity sensor assembly 110 positioned in close proximity to drive shaft 104 for measuring and/or monitoring a distance (not shown in FIG. 1) defined between drive shaft 104 and sensor assembly 110. Moreover, in the exemplary embodiment, sensor assembly 110 uses microwave signals to measure a proximity of a component of power system 100 with respect to sensor assembly 110. As used herein, the term "microwave" refers to a signal or a component that receives and/or transmits signals having one or more frequencies between about 300 Megahertz (MHz) and about 300 Gigahertz (GHz). Alternatively, sensor assembly 110 may measure and/or monitor any other component of power system 100, and/or may be any other sensor or transducer assembly that enables power system 100 to function as described herein. In the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change position with respect to at least one sensor assembly 110. For example, vibrations may be induced within the components and/or the components may expand or contract as the operating temperature within power system 100 changes. In the exemplary embodiment, sensor assemblies 110 measure and/or monitor the proximity, the position, and/or the amount of vibration of the components relative to each sensor assembly 110 and transmit a signal representative of the measured proximity, position, and/or amount of vibration of the components (hereinafter referred to as a "proximity measurement signal") to diagnostic system 112 for processing and/or analysis.

Figure 2:
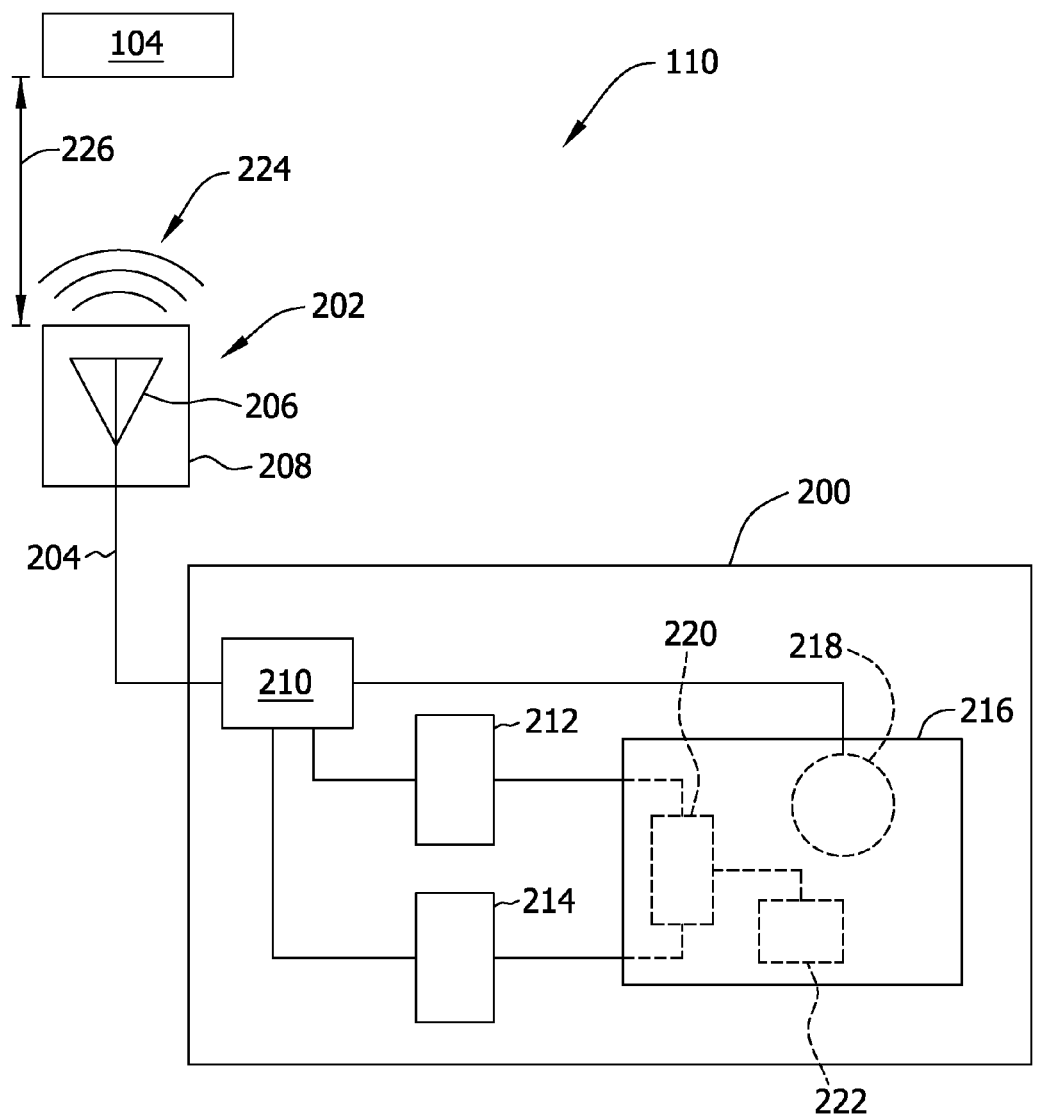
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a probe 202 coupled to signal processing device 200 via a data conduit 204. Moreover, in the exemplary embodiment, probe 202 includes an emitter 206 coupled to and/or positioned within a probe housing 208. More specifically, in the exemplary embodiment, probe 202 is a microwave sensor probe 202 that includes a microwave emitter 206. As such, in the exemplary embodiment, emitter 206 has at least one resonant frequency within a microwave frequency range.

In the exemplary embodiment, signal processing device 200 includes a directional coupling device 210 coupled to a transmission power detector 212, to a reception power detector 214, and to a signal conditioning device 216. Moreover, in the exemplary embodiment, signal conditioning device 216 includes a signal generator 218, a subtractor 220, and a linearizer 222. Emitter 206 emits an electromagnetic field 224 when a microwave signal is transmitted through emitter 206.

During operation, in the exemplary embodiment, signal generator 218 generates at least one electrical signal with a microwave frequency (hereinafter referred to as a "microwave signal") that is equal to, or approximately equal to, at least one resonant frequency of emitter 206. Signal generator 218 transmits the microwave signal to directional coupling device 210. Directional coupling device 210 transmits a portion of the microwave signal to emitter 206 and the remaining portion of the microwave signal to transmission power detector 212. As the microwave signal is transmitted through emitter 206, electromagnetic field 224 is emitted from emitter 206 and out of probe housing 208. If an object, such as a drive shaft 104 or another component of machine 102 (shown in FIG. 1) and/or of power system 100 enters and/or changes a relative position within electromagnetic field 224, an electromagnetic coupling may occur between the object and field 224. More specifically, because of the presence of the object within electromagnetic field 224 and/or because of such object movement, electromagnetic field 224 may be disrupted, for example, because of an induction and/or capacitive effect induced within the object that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced within emitter 206. The loading induced within emitter 206 causes at least one reflection of the microwave signal (hereinafter referred to as a "detuned loading signal") to be transmitted through data conduit 204 to directional coupling device 210. In the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception power detector 214.

In the exemplary embodiment, reception power detector 214 determines an amount of power based on, and/or contained within, the detuned loading signal and transmits a signal representative of the detuned loading signal power to signal conditioning device 216. Moreover, transmission power detector 212 determines an amount of power based on, and/or contained within, the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power. Subtractor 220 transmits a signal representative of the calculated difference (hereinafter referred to as a "power difference signal") to linearizer 222. In the exemplary embodiment, an amplitude of the power difference signal is proportional, such as inversely or exponentially proportional, to a distance 226 defined between the object, such as drive shaft 104, within electromagnetic field 224 and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the proximity measurement signal. Moreover, in the exemplary embodiment, linearizer 222 transmits the proximity measurement signal to diagnostic system 112 (shown in FIG. 1) with a scale factor suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
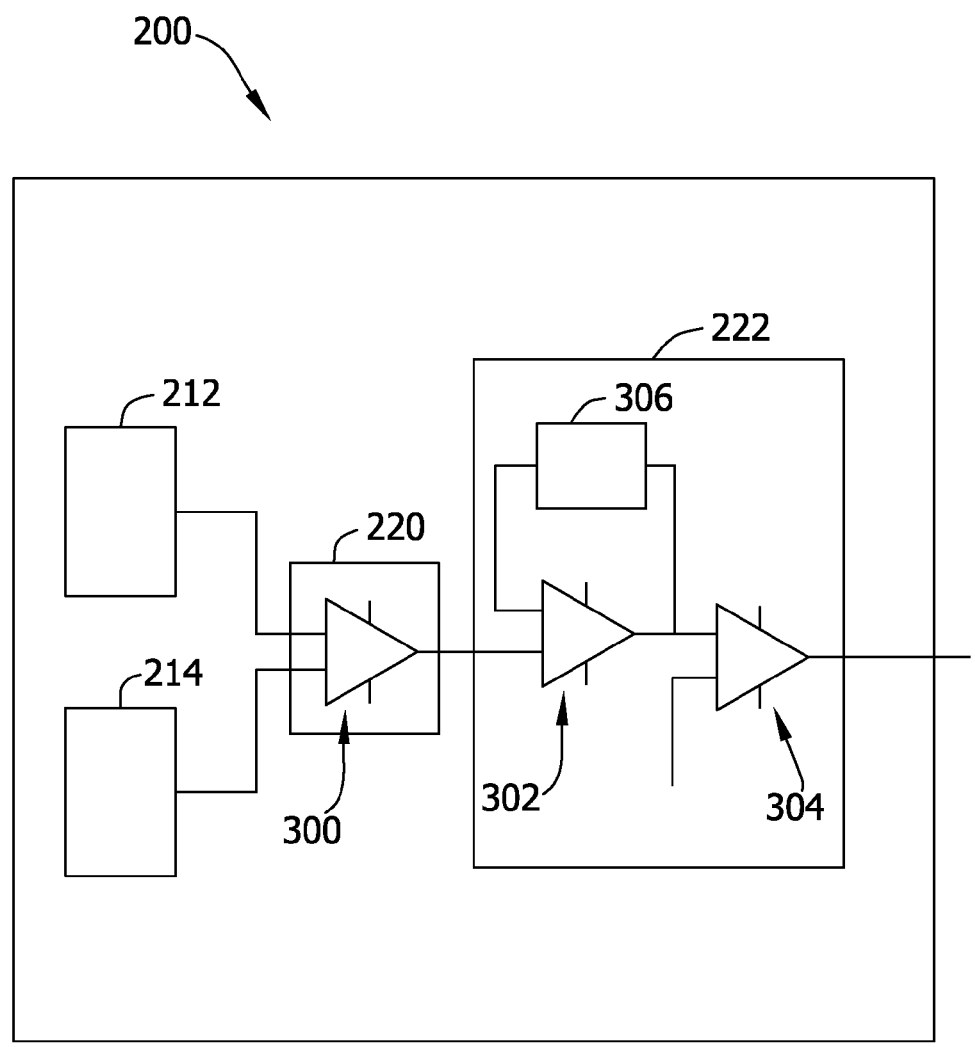
FIG. 3 is a block diagram of a portion of an exemplary signal processing device that may be used with the sensor assembly shown in FIG. 2.

FIG. 3 is a block diagram of a portion of an exemplary signal processing device 200 that may be used with sensor assembly 110 (shown in FIG. 2). In the embodiment illustrated in FIG. 3, signal processing device 200 includes a plurality of analog components, such as a plurality of operational amplifiers, as described more fully herein. Alternatively, signal processing device 200 may include any other component that enables signal processing device 200 to function as described herein. In the exemplary embodiment, transmission power detector 212 determines an amount of power based on and/or contained within the microwave signal and transmits a signal representative of the microwave signal power to subtractor 220, as described above with reference to FIG. 2. Moreover, in the exemplary embodiment, reception power detector 214 determines an amount of power based on and/or contained within the detuned loading signal and transmits a signal representative of the detuned loading signal power to subtractor 220, as described above with reference to FIG. 2.

Subtractor 220, in the exemplary embodiment, includes a difference amplifier 300 that subtracts the detuned loading signal power from the microwave signal power and transmits a power difference signal to linearizer 222. In an alternative embodiment, subtractor 220 may include any other device that determines a difference between the microwave signal power and the detuned loading signal power. In the exemplary embodiment, the power difference signal is exponentially, logarithmically, and/or inversely proportional to distance 226 (shown in FIG. 2) defined between an object, such as drive shaft 104 (shown in FIG. 1), and probe 202 and/or emitter 206 (both shown in FIG. 2).

In the exemplary embodiment, linearizer 222 includes a loop amplifier 302 coupled to difference amplifier 300 and a scaling amplifier 304 coupled to loop amplifier 302. In the exemplary embodiment, difference amplifier 300, loop amplifier 302, and scaling amplifier 304 are operational amplifiers. Alternatively, linearizer 222 includes any other device or devices that enable linearizer 222 to function as described herein. Loop amplifier 302 receives the power difference signal from difference amplifier 300 and generates a substantially linear output signal based on the power difference signal. More specifically, an output of loop amplifier 302 is transmitted to a transfer function device 306. In the exemplary embodiment, transfer function device 306 generates an output signal that corresponds to a transformation of an input signal (i.e., the output signal is a transformation of the input signal). In one embodiment, the transformation of the input signal includes shifting, offsetting, and/or inverting the input signal. As such, transfer function device 306 transmits an output signal to loop amplifier 302 that is a transformation of the signal output from loop amplifier 302 such that a transfer function feedback loop is provided. Loop amplifier 302 subtracts the transformed signal from the power difference signal and generates a voltage output representative of the calculated difference. Such a transfer function feedback loop of loop amplifier 302 enables loop amplifier 302 to transform the power difference signal into a voltage output signal (i.e., a "proximity measurement signal") that exhibits a substantially linear relationship between the object proximity and the amplitude of the proximity measurement signal.

Loop amplifier 302 transmits the proximity measurement signal to scaling amplifier 304 to adjust an amplitude of the proximity measurement signal. In the exemplary embodiment, scaling amplifier 304 increases the amplitude of the proximity measurement signal to an amplitude suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein. The amplified proximity measurement signal may be transmitted to diagnostic system 112 and/or to any other device or system for output or display to a user and/or for further processing and/or analysis.

Figure 4:
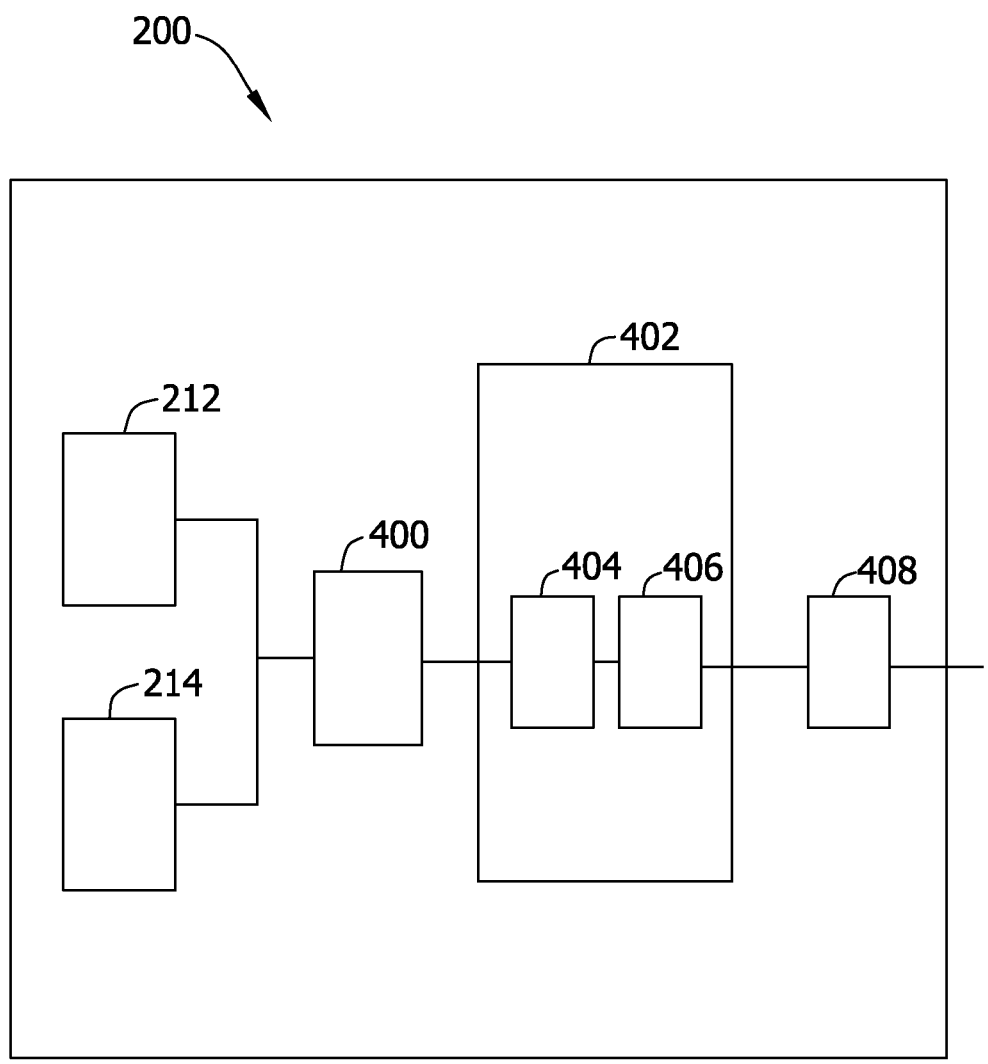
FIG. 4 is a block diagram of a portion of an alternative signal processing device that may be used with the sensor assembly shown in FIG. 2.

FIG. 4 is a block diagram of a portion of an alternative signal processing device 200 that may be used with sensor assembly 110 (shown in FIG. 2). In the embodiment illustrated in FIG. 3, signal processing device 200 includes at least one digital component, such as a processor, as described more fully herein. Alternatively, signal processing device 200 may include any other component that enables signal processing device 200 to function as described herein. In the exemplary embodiment, transmission power detector 212 determines an amount of power based on and/or contained within the microwave signal and transmits a signal representative of the microwave signal power to an analog-to-digital (A-D) converter 400. Moreover, in the exemplary embodiment, reception power detector 214 determines an amount of power based on and/or contained within the detuned loading signal and transmits a signal representative of the detuned loading signal power to A-D converter 400.

In the exemplary embodiment, A-D converter 400 converts the analog signal representative of the microwave signal power to a digital signal representative of the microwave signal power (hereinafter referred to as a "digital microwave power signal"). A-D converter 400 converts the analog signal representative of the detuned loading signal power to a digital signal representative of the detuned loading signal power (hereinafter referred to as a "digital loading power signal"). A-D converter 400 transmits the digital microwave power signal and the digital loading power signal to a processor 402.

Processor 402 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Processor 402 is programmed with a subtractor 404 and a linearizer 406 (i.e., subtractor 404 and linearizer 406 are embodied within processor 402). Subtractor 404 calculates a difference between the digital microwave power signal and the digital loading power signal and generates a resulting power difference signal. Subtractor 404 transmits the power difference signal to linearizer 406. In the exemplary embodiment, the power difference signal is exponentially, logarithmically, and/or inversely proportional to distance 226 (shown in FIG. 2) defined between an object, such as drive shaft 104 (shown in FIG. 1), and probe 202 and/or emitter 206 (both shown in FIG. 2).

In the exemplary embodiment, linearizer 406 includes a transfer function programmed within processor 402. Processor 402 executes the transfer function to transform the power difference signal into an output signal (i.e., a "proximity measurement signal") that exhibits a substantially linear relationship between the object proximity and the amplitude of the output signal. More specifically, in the exemplary embodiment, the transfer function uses the power difference signal and a transformation of the power difference signal to generate a substantially linear proximity measurement signal. In one embodiment, the transformation of the power difference signal includes shifting, offsetting, and/or inverting the power difference signal. In such an embodiment, the transfer function subtracts the transformation of the power difference signal from the power difference signal to generate the substantially linear proximity measurement signal. Linearizer 406 transmits the proximity measurement signal to a digital-to-analog ("D-A") converter 408.

D-A converter 408, in the exemplary embodiment, converts the digital proximity measurement signal to an analog proximity measurement signal. Moreover, D-A converter 408 may adjust the amplitude of the analog proximity measurement signal to a suitable level in a similar manner as described above with reference to FIG. 3. D-A converter 408 transmits the analog proximity measurement signal to diagnostic system 112 and/or to any other device or system for display to a user and/or for further processing and/or analysis. Alternatively, signal processing device 200 does not include D-A converter 408, and the proximity measurement signal is transmitted to diagnostic system 112 and/or to any other device or system as a digital signal.

In an alternative embodiment, transmission power detector 212 and/or reception power detector 214 may be omitted, and processor 402 may calculate the power contained in or based on the microwave signal and the detuned loading signal. In such an embodiment, A-D converter 400 converts the microwave signal and the detuned loading signal into respective digital signals, and processor 402 performs the calculations described herein on the digital signals.

A technical effect of the systems and methods described herein includes at least one of: (a) generating an electromagnetic field based on at least one microwave signal transmitted to the emitter; (b) generating at least one loading signal representative of a loading induced within the emitter by an interaction of the machine component with the electromagnetic field; (c) generating a substantially linear proximity measurement of the machine component to the emitter based on the at least one loading signal; and (d) outputting the proximity measurement to a user.

The above-described embodiments provide an efficient and cost-effective sensor assembly for use in measuring the proximity of a machine component. The sensor assembly drives an emitter with a microwave signal to generate an electromagnetic field. When an object, such as a machine component, is positioned within the field, the object causes a disruption of the electromagnetic field. The disruption detunes the emitter, and a loading signal representative of a loading induced within the emitter is generated, or reflected from the microwave signal through a data conduit to a signal processing device. The signal processing device uses a linearizer that includes an analog-based or a digital-based transfer function to generate a substantially linear proximity measurement from the loading signal.

Exemplary embodiments of a sensor assembly, a power system, and a method for measuring a proximity of a machine component relative to an emitter are described above in detail. The sensor assembly, power system, and method are not limited to the specific embodiments described herein, but rather, components of the sensor assembly and/or power system and/or steps of the method may be utilized independently and separately from other components and/or steps described herein. For example, the sensor assembly may also be used in combination with other measuring systems and methods, and is not limited to practice with only the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A microwave sensor assembly comprising:
at least one probe comprising an emitter having at least one resonant frequency within a microwave frequency range, said emitter configured to:
generate an electromagnetic field from at least one microwave signal at said at least one resonant frequency;
change the at least one resonant frequency in response to a change in relative position of an object within said electromagnetic field; and
generate at least one loading signal representative of a loading induced within said emitter by said change in relative position of said object within the electromagnetic field; and
a signal processing device coupled to said at least one probe, said signal processing device comprising a linearizer including a feedback loop amplifier, said linearizer configured to generate a substantially linear output signal based on the at least one loading signal and an amplified feedback loop signal.

2. A microwave sensor assembly in accordance with claim 1, wherein said signal processing device is configured to generate a substantially linear output representative of a proximity of the object to said emitter when said emitter is energized by the at least one microwave signal.

3. A microwave sensor assembly in accordance with claim 1, wherein said linearizer comprises a transfer function programmed within a processor.

4. A microwave sensor assembly in accordance with claim 1, wherein said linearizer comprises at least one operational amplifier.

5. A microwave sensor assembly in accordance with claim 1, further comprising a first power detector that detects an amount of power contained in the at least one microwave signal.

6. A microwave sensor assembly in accordance with claim 5, further comprising a second power detector that detects an amount of power contained in the at least one loading signal.

7. A microwave sensor assembly in accordance with claim 1, wherein said signal processing device is configured to calculate a proximity of the object to said emitter based on a difference between an amount of power contained in the at least one microwave signal and an amount of power contained in the at least one loading signal.

8. A power system comprising:
a machine; and
a microwave sensor assembly positioned proximate said machine, said microwave sensor assembly comprising:
at least one probe comprising an emitter having at least one resonant frequency within a microwave frequency range, said emitter configured to:
generate an electromagnetic field from at least one microwave signal at said at least one resonant frequency, wherein a loading is induced within said emitter when at least one component of said machine changes its relative position within the electromagnetic field; and
generate at least one loading signal representative of the induced loading; and
a signal processing device coupled to said at least one probe, said signal processing device comprising a linearizer including a feedback loop amplifier, said linearizer configured to generate a substantially linear output signal based on the at least one loading signal and an amplified feedback loop signal.

9. A power system in accordance with claim 8, wherein said signal processing device is configured to generate a substantially linear output representative of a proximity of the at least one component to said emitter when said emitter is energized by the at least one microwave signal.

10. A power system in accordance with claim 8, wherein said signal processing device comprises a processor, and wherein said linearizer comprises a transfer function programmed within said processor.

11. A power system in accordance with claim 8, wherein said linearizer comprises at least one operational amplifier.

12. A power system in accordance with claim 8, further comprising a first power detector that detects an amount of power contained in the at least one microwave signal.

13. A power system in accordance with claim 12, further comprising a second power detector that detects an amount of power contained in the at least one loading signal.

14. A power system in accordance with claim 8, wherein said signal processing device is configured to calculate a proximity of the at least one component to said emitter based on a difference between an amount of power contained in the at least one microwave signal and an amount of power contained in the at least one loading signal.

15. A method for measuring a proximity of a machine component relative to an emitter having at least one resonant frequency within a microwave frequency range, said method comprising:
   generating an electromagnetic field based on at least one microwave signal transmitted to the emitter at said at least one resonant frequency;
   generating at least one loading signal representative of a loading induced within the emitter by an interaction of the machine component with the electromagnetic field;
   generating a substantially linear proximity measurement of the machine component to the emitter based on the at least one loading signal and an amplified feedback loop signal; and
   outputting the proximity measurement to a user.

16. A method in accordance with claim 15, wherein generating a substantially linear proximity measurement comprises programming a processor with a transfer function to generate the substantially linear proximity measurement of the machine component to the emitter based on the at least one loading signal.

17. A method in accordance with claim 15, wherein generating a substantially linear proximity measurement comprises configuring at least one operational amplifier to generate the substantially linear proximity measurement of the machine component to the emitter based on the at least one loading signal.

18. A method in accordance with claim 15, further comprising detecting an amount of power contained in the at least one microwave signal.

19. A method in accordance with claim 15, further comprising detecting an amount of power contained in the at least one loading signal.

20. A method in accordance with claim 15, further comprising determining a proximity of the machine component to the emitter based on a difference between an amount of power contained in the at least one microwave signal and an amount of power contained in the at least one loading signal.

* * * * *